(12) United States Patent
Katoh

(10) Patent No.: US 6,467,881 B2
(45) Date of Patent: Oct. 22, 2002

(54) INK JET HEAD, INK JET HEAD PRODUCTION METHOD, AND IMAGING APPARATUS EMPLOYING SUCH INK JET HEAD

(75) Inventor: Seiichi Katoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/915,877

(22) Filed: Jul. 26, 2001

(65) Prior Publication Data

US 2002/0018100 A1 Feb. 14, 2002

(30) Foreign Application Priority Data

Aug. 4, 2000 (JP) .......................... 2000-237824

(51) Int. Cl.[7] .................................. B41J 2/06
(52) U.S. Cl. ...................................... 347/55
(58) Field of Search .................. 347/55, 151, 120, 347/141, 154, 103, 123, 111, 159, 127, 128, 131, 125, 158; 399/271, 290, 292, 293, 294, 295

(56) References Cited

FOREIGN PATENT DOCUMENTS

| JP | 6-55732 | 3/1994 |
| JP | 7125196 | 5/1995 |
| JP | 200052544 | 2/2000 |

OTHER PUBLICATIONS

U.S. Application No. 09/369,631 filed Aug. 6, 1999.
U.S. Application No. 09/113,638 filed Jul. 10, 1998.
U.S. Application No. 09/793,478 filed Feb. 26, 2001.
U.S. Application No. 09/632,046 filed Aug. 3, 2000.
U.S. Application No. 09/632,047 filed Aug. 3, 2000.

*Primary Examiner*—Raquel Yvette Gordon
(74) *Attorney, Agent, or Firm*—Cooper & Dunham LLP

(57) ABSTRACT

An ink jet head includes a liquid chamber for containing ink formed in a first substrate, a diaphragm formed in the first substrate, an individual electrode formed on a second substrate, and an active element formed in the second substrate. The individual electrode is formed of a refractory metal and a compound thereof. The active element forms a driving circuit for driving said diaphragm. The diaphragm is deformable by electrostatic force generated between the diaphragm and the individual electrode and exerts restoring force of the diaphragm to pressurize the liquid chamber so that the ink is ejected from the ink jet head.

26 Claims, 12 Drawing Sheets

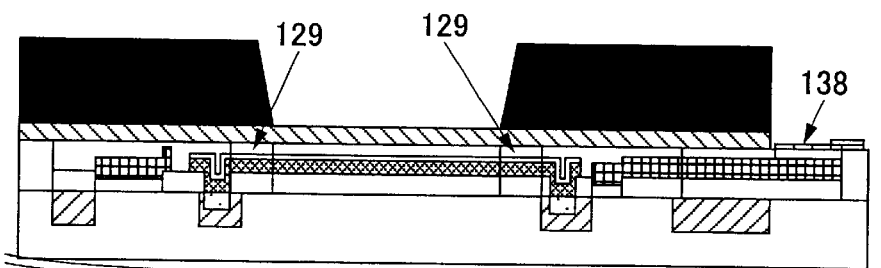
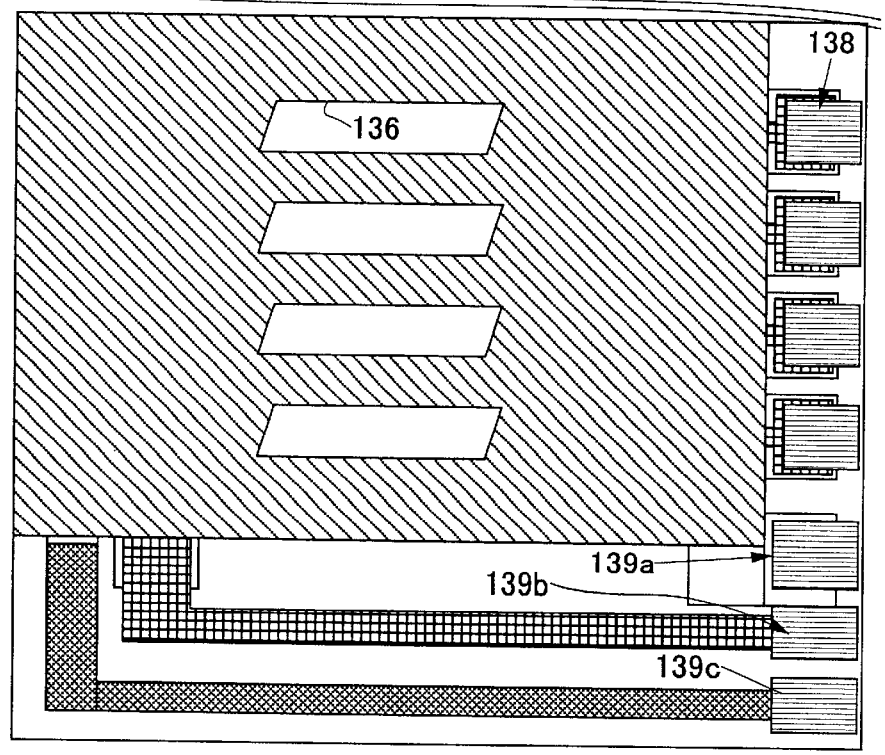

INK JET HEAD, INK JET HEAD PRODUCTION METHOD, AND IMAGING APPARATUS EMPLOYING SUCH INK JET HEAD

BACKGROUND OF THE INVENTION

1. Field of the Invention

The present invention relates to ink jet heads, ink jet head production methods, and imaging apparatuses employing such ink jet heads, and more particularly to an ink jet head for image formation employed in imaging apparatuses such as copiers, facsimile machines, and printers, a method of producing such an ink jet head, and an imaging apparatus employing such an ink jet head.

2. Description of the Related Art

A recent trend toward color recording has boosted a demand for imaging apparatuses using a drop-on-demand ink jet head, so that such imaging apparatuses has been commonly used. In addition, there has been a strong demand for an increase in the number of nozzles and nozzle density for achieving higher image quality and a higher recording rate.

In response to such a demand, there has been produced an ink jet head that ejects ink pressurized by the restoring force of an electrostatic diaphragm deformed by electrostatic force generated between the electrostatic diaphragm and a corresponding counter electrode. Such an ink jet head, which employs a diffusion layer formed on a silicon (Si) substrate as counter electrodes, has a simple structure and operation principle. Therefore, energetic efforts have been made to develop an ink jet head of this type as one of favorable means for realizing high nozzle density in ink jet heads.

Japanese Laid-Open Patent Application No. 6-55732 represents this kind of prior art. This document points out the possibility of forming driver devices in single-crystal silicon forming ink chambers and diaphragms in an electrostatic ink jet head as shown in FIG. 1. According to FIG. 1, which is a sectional view of a bit (an ink jet unit) of the ink jet head, the ink jet head includes a Si substrate 71, a cover glass 72, a boro-silicate glass substrate 73, a counter electrode 74, a nozzle 75, a cavity 76, a diaphragm 77, a channel 78, an ink chamber 79, an ink supply pipe 80, a power supply 81, a seal 82, an insulating film 83, a common electrode 84, and a contact 85.

It is common knowledge that a head cannot be driven at a high speed unless a value of resistance of a diaphragm is lowered. That is, the impurity concentration of single-crystal silicon is increased to lower the value of resistance so that the head is driven at a high speed. However, it is impossible to form a device in the single-crystal silicon whose impurity concentration is increased because the impurity concentration is too high. Therefore, although the above-described document points out the possibility of forming the driver devices in the single-crystal silicon, the document, in practice, only employs a conventional method of forming a thin metal film on the diaphragms. Such a structure, however, lowers junction quality of an electrode substrate and an ink chamber substrate, thus causing a problem.

On the other hand, Japanese Laid-Open Patent Application No. 7-125196, which is another prior art example, discloses a technique for charging and discharging by using an active element in driving a diaphragm. However, this document only points out simply that the active element is used in charging and discharging, and has no direct relation to an idea of actively forming the active element in a Si substrate, which is an aim of the present invention.

Japanese Laid-Open Patent Application No. 2000-52544 discloses a technique for forming a diffusion layer into individual electrodes, and in this respect, this application has the same idea as the present invention. However, this application is totally different from the present invention in electrode structure.

Further, in an electrostatic ink jet head ejecting ink by using the restoring force of elastic diaphragms, each diaphragm inevitably has a width in the direction of its shorter side reduced as nozzle density increases. The displacement of each diaphragm is proportional to the fourth power of its shorter-side length, thus requiring a very high driving voltage. For instance, if each diaphragm has a thickness of about 1.5 $\mu$m but a shorter-side length of 55 $\mu$m, the driving voltage becomes as high as about 100 V. The number of nozzles increases as the nozzle density increases. Therefore, an increase in the driving voltage boosts the cost of the driving circuit of each bit, thus resulting in extremely high total costs.

SUMMARY OF THE INVENTION

It is a general object of the present invention to provide an ink jet head in which the above-described disadvantages are eliminated, a method of producing such an ink jet head, and an imaging apparatus using such an ink jet head.

A more specific object of the present invention is to provide an ink jet head in which the number of nozzles and nozzle density are increased to satisfy a demand for high-quality images and high-speed recording in an ink jet imaging apparatus, and more particularly, an ink jet head made operable at a high speed by forming an active element on an electrode substrate.

Yet another more specific object of the present invention is to provide a method of producing such an ink jet head at low costs by fabricating an inexpensive driving circuit by forming a high-voltage driving active element such as a MOS transistor in a substrate.

It is also more specific object of the present invention to provide an imaging apparatus using such an ink jet head.

The above objects of the present invention are achieved by an ink jet head including: a liquid chamber for containing ink, the liquid chamber being formed in a first substrate; a diaphragm formed in the first substrate to serve as a bottom of the liquid chamber; an individual electrode formed on a second substrate, the individual electrode being formed of a refractory metal and a compound thereof; and an active element forming a driving circuit for driving the diaphragm, the active element being formed in the second substrate, wherein the diaphragm is deformable by electrostatic force generated between the diaphragm and the individual electrode and exerts restoring force of the diaphragm to pressurize the liquid chamber so that the ink is ejected from the ink jet head.

According to the above-described ink jet head, since the driving active element for high voltage is formed on the substrate, the output of the driving integrated circuit may be a low voltage, thus reducing the costs of the driving circuit.

The above objects of the present invention are also achieved by an ink jet head including: a liquid chamber for containing ink, the liquid chamber being formed in a first substrate; a diaphragm formed in the first substrate to serve as a bottom of the liquid chamber; an individual electrode formed on a second substrate; and a MOS transistor formed in the second substrate as an active element forming a driving circuit for driving the diaphragm, wherein the diaphragm is deformable by electrostatic force generated between the diaphragm and the individual electrode and exerts restoring force of the diaphragm to pressurize the liquid chamber so that the ink is ejected from the ink jet head.

According to the above-described ink jet head, the MOS transistor and the individual electrode are formed on the same substrate. Therefore, although at least one high-voltage driving power source is required, a signal voltage applied to the gate of each bit of the ink jet head may be low, thus reducing the costs of the driving integrated circuit of the ink jet head.

The above objects of the present invention are also achieved by an ink jet head including: a liquid chamber for containing ink, the liquid chamber being formed in a first substrate; a diaphragm formed in the first substrate to serve as a bottom of the liquid chamber; a film of a thin film semiconductor material formed on a second substrate; an individual electrode formed on the second substrate and including the thin film semiconductor material; and an active element forming a driving circuit for driving the diaphragm, the active element being formed on the second substrate and including the thin film semiconductor material, wherein the diaphragm is deformable by electrostatic force generated between the diaphragm and the individual electrode and exerts restoring force of the diaphragm to pressurize the liquid chamber so that the ink is ejected from the ink jet head.

The above objects of the present invention are also achieved by an imaging apparatus including an ink jet head including: a liquid chamber for containing ink, the liquid chamber being formed in a first substrate; a diaphragm formed in the first substrate to serve as a bottom of the liquid chamber; an individual electrode formed on a second substrate, the individual electrode being formed of a refractory metal and a compound thereof; and an active element forming a driving circuit for driving the diaphragm, the active element being formed in the second substrate, wherein the diaphragm is deformable by electrostatic force generated between the diaphragm and the individual electrode and exerts restoring force of the diaphragm to pressurize the liquid chamber so that the ink is ejected from the ink jet head.

The above objects of the present invention are also achieved by an imaging apparatus including an ink jet head including: a liquid chamber for containing ink, the liquid chamber being formed in a first substrate; a diaphragm formed in the first substrate to serve as a bottom of the liquid chamber; an individual electrode formed on a second substrate; and a MOS transistor formed in the second substrate as an active element forming a driving circuit for driving the diaphragm, wherein the diaphragm is deformable by electrostatic force generated between the diaphragm and the individual electrode and exerts restoring force of the diaphragm to pressurize the liquid chamber so that the ink is ejected from the ink jet head.

The above objects of the present invention are also achieved by an imaging apparatus including an ink jet head including: a liquid chamber for containing ink, the liquid chamber being formed in a first substrate; a diaphragm formed in the first substrate to serve as a bottom of the liquid chamber; a film of a thin film semiconductor material formed on a second substrate; an individual electrode formed on the second substrate and including the thin film semiconductor material; and an active element forming a driving circuit for driving the diaphragm, the active element being formed on the second substrate and including the thin film semiconductor material, wherein the diaphragm is deformable by electrostatic force generated between the diaphragm and the individual electrode and exerts restoring force of the diaphragm to pressurize the liquid chamber so that the ink is ejected from the ink jet head.

According to any of the above-described apparatuses, the production costs of the driving circuit for driving each bit of the ink jet head of this imaging apparatus are kept low by lowering a driving voltage even when the number of bits is increased for a high-speed recording purpose. Accordingly, any of the above-described apparatuses is also producible at low costs.

The above objects of the present invention are further achieved by an ink jet head production method including the steps of: (a) providing first and second substrates; (b) forming an individual electrode and an active element in the first substrate; (c) forming a liquid chamber and a diaphragm in the second substrate; and (d) bonding the first and second substrates.

According to the above-described method, the liquid chamber and the diaphragm are produced after the first (electrode) substrate is produced by a conventional semiconductor production method. Therefore, a semiconductor production process apt to be affected by alkali ions and a liquid chamber production process using alkali ions are completely separable.

BRIEF DESCRIPTION OF THE DRAWINGS

Other objects, features and advantages of the present invention will become more apparent from the following detailed description when read in conjunction with the accompanying drawings, in which:

FIGS. 4A and 4B are other diagrams for illustrating the ink jet head production method;

DETAILED DESCRIPTION OF THE PREFERRED EMBODIMENTS

A description will now be given, with reference to the accompanying drawings, of embodiments of the present invention.

An ink jet head of the present invention is of an electrostatic type where voltage is applied to counter electrodes and diaphragms facing liquid pressure chambers so that the diaphragms are displaced by electrostatic force, and the electrostatic force is released to pressurize the liquid pressure chambers with the restoring force of the diaphragms so that ink is ejected. In the present invention, coordination with process temperature is achieved by forming each counter electrode of a refractory metal and a compound thereof. Further, each driving element is formed on the same substrate as the counter electrodes.

First Embodiment

Figure 2:
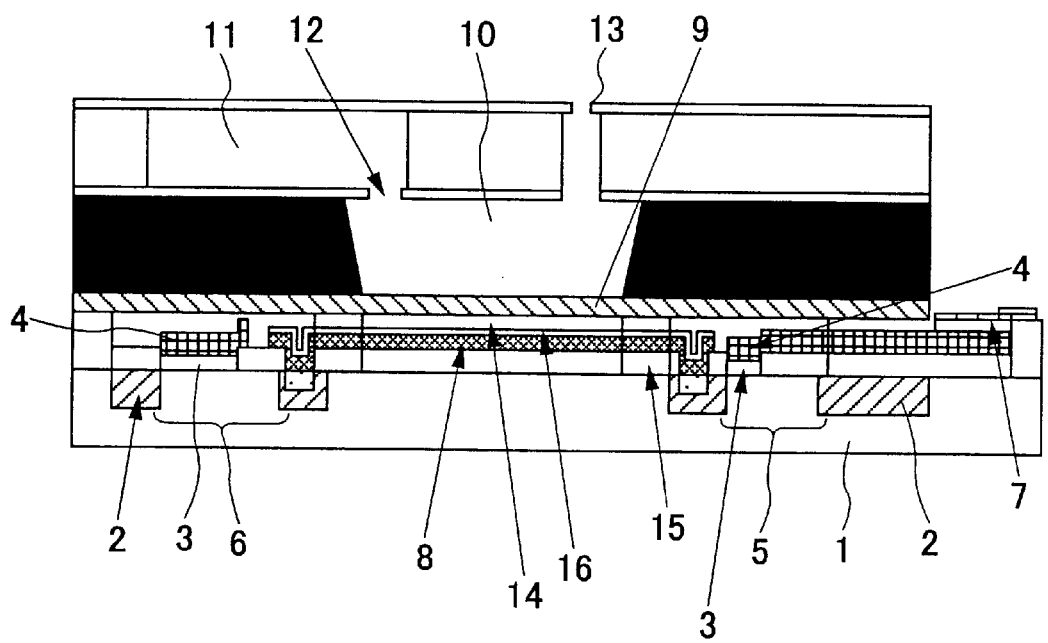
FIG. 2 is a sectional view of an ink jet head according to a first embodiment of the present invention.

FIG. 2 is a sectional view of an ink jet head using n-channel MOS transistors according to a first embodiment of the present invention. More specifically, FIG. 2 is a sectional view of a bit (an ink jet unit) of the ink jet head. The ink jet head may include one bit or more.

According to FIG. 2, the ink jet head includes, in each bit thereof, a Si substrate 1, an n-type diffusion layer 2, a gate oxide film 3, polysilicon gate electrodes 4, an electrode 7, an individual counter electrode 8, a diaphragm 9, a liquid pressure chamber 10, a common liquid chamber 11, a fluid resistance (channel) 12, a nozzle 13, a gap 14, partition walls 15, and a passivation oxide film 16. A MOS transistor 5 for driving the diaphragm 9 is defined by the n-type diffusion layer 2, the gate oxide film 3, and the polysilicon gate electrode 4, and similarly, a MOS transistor 6 for discharging electric charge is defined by the n-type diffusion layer 2, the gate oxide film 3, and the polysilicon gate electrode 4.

In a bit from which ink is desired to be ejected (a desired bit), a driving signal is transmitted to the electrode 7 to increase the gate voltage of the MOS transistor 5 so that the MOS transistor 5 is turned on. The individual counter electrode 8 is supplied and charged with voltage from a DC source, thereby deforming the diaphragm 9. As a result, the volume of the liquid pressure chamber 10 is increased so that the ink is supplied from the common liquid chamber 11 through the fluid resistance 12 to the liquid pressure room 10.

Next, the gate voltage of the MOS transistor 5 is lowered to turn off the MOS transistor 5. Then, a signal voltage is applied to the gate of the MOS transistor 6. Thereby, the MOS transistor 6 is turned on to discharge electric charge held between the individual counter electrode 8 and the diaphragm 9. This discharge returns the diaphragm 9 to its original position so that the ink filled into the liquid pressure chamber 10 is pressurized to be ejected from the nozzle 13.

The n-channel MOS transistors employed in this embodiment may be replaced with p-channel MOS transistors. Further, the individual counter electrode 8, which, in this embodiment, is formed of TiN (titanium nitride) that is a compound of a refractory metal, may be formed of W (tungsten) and tungsten silicide.

Next, a description will be given, with reference to FIGS. 3A through 5, of a production method of a high-density ink jet head with a nozzle density of 300 dpi according to the first embodiment of the present invention. This method employs a common MOS device production process. FIGS. 3A through 5 except for FIG. 4A, only show one bit of the ink jet head for simplicity purposes, and a description is made accordingly.

A produced ink jet head has the following dimensions: a diaphragm is 1.5 $\mu$m in thickness and 55 $\mu$m in width (shorter-side length), a liquid pressure chamber is 100 $\mu$m in height and 2 mm in length (longitudinal-side length), a partition wall of the liquid pressure chamber is 29.7 $\mu$m in width. A displacement of the diaphragm is 0.15 $\mu$m and an ink ejection is 7 pl.

In this production method, single-crystal silicon is employed as an individual counter electrode substrate and TiN is employed for each individual counter electrode. MOS transistors are formed in the Si substrate as active elements. Although bipolar transistors, junction FETs (field effect transistors), thyristors, or UJTs (unijunction transistors) are formable as active elements, it is advantageous and preferable, in terms of costs, to form MOS transistors each using a thermal oxide film for a gate insulating film and formable in a shorter production process. A silicon oxide (SiO2) film is used for an insulating material for the MOS transistors. Hereinafter, a term "oxide film" refers to a SiO2 film.

Figure 3A:
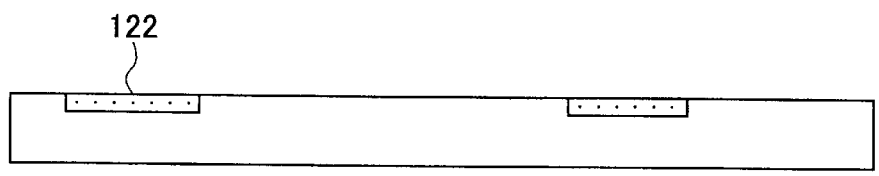
FIGS. 3A through 3H are diagrams for illustrating an ink jet head production method according to a first embodiment of the present invention.

(A) A (100) single-crystal p-type Si substrate 121 of a sheet resistance of 10 $\Omega$cm is preferably used. A resist is patterned on the Si substrate 121 by photolithography, and a 2E12/cm$^2$ dose of B (boron) is ion-implanted into the Si substrate 121 at an energy of 30 KeV. A P-type impurity layer 122 consequently formed where MOS transistor for charging and discharging are formed is called a channel stopper that is an acceptor impurity preformed to prevent the spread of an n-type inversion layer to the sides of gates and consequent current leakage (FIG. 3A).

Figure 3B:
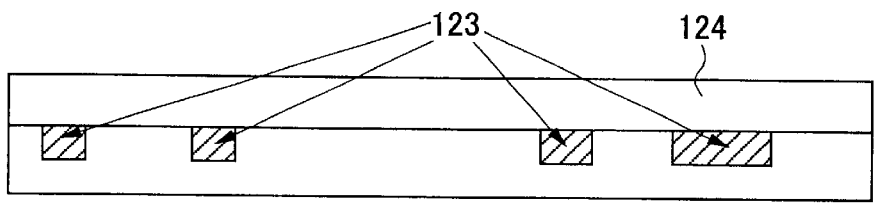

(B) A resist pattern is formed by photolithography. A 3E15/cm$^2$ dose of P (phosphorus) is ion-implanted at an energy of 50 KeV, and an n$^+$ diffusion layer 123 is formed by performing heat treatment for 40 minutes at 1150° C. in a nitrogen atmosphere. A thermal oxide film 124 of 2000 nm in thickness is formed through thermal oxidation at 1100° C. (FIG. 3B).

Figure 3C:
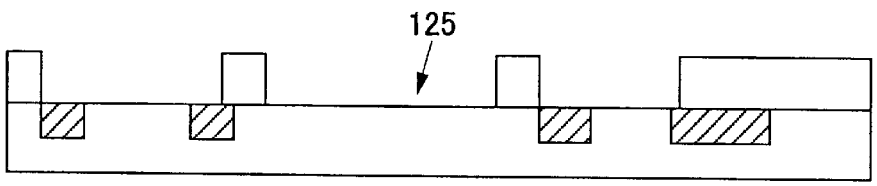

(C) A pattern for a gap 125 between a diaphragm and an individual counter electrode is formed by photolithography using a photoresist. Dry etching is performed on the oxide film 124 using CHF$_3$ (trifluoromethane) gas so that the surface of the Si substrate 121 is exposed (FIG. 3C).

Figure 3D:
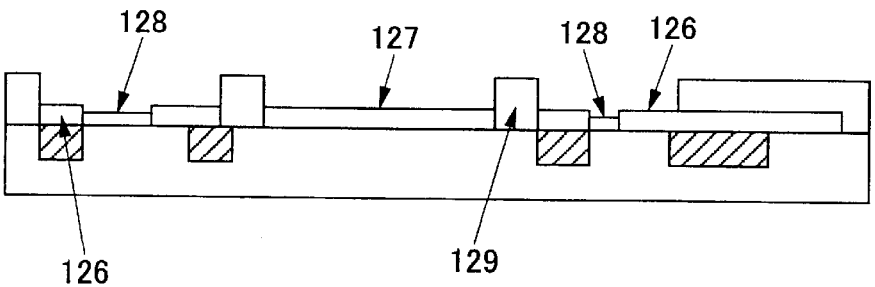

(D) In order to perform selective oxidation by LOCOS (local oxidation of silicon), a buffer oxide film of 20 nm in thickness is formed and a silicon nitride film is formed by LPCVD (low pressure chemical vapor deposition). A resist pattern is formed by photolithography and openings are formed in the silicon nitride film by dry etching. Thermal oxidation is performed so that a field oxide film 126 of 210 nm in thickness and an oxide film 127 of 210 nm in thickness serving as a base for the individual counter electrode. The oxide films 126 and 127 are each etched by approximately 10 nm in thickness by a HF (hydrogen fluoride) aqueous solution, and etching is performed on the overall surfaces of the nitride film using thermal phosphoric acid. A gate oxide film 128 of 50 nm in thickness is formed by dry oxidation. The thickest parts of the thermal oxide film 124 are formed into partition walls 129 (FIG. 3D).

Figure 3E:
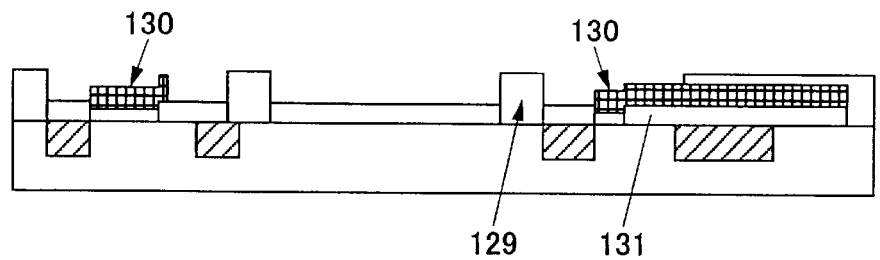

(E) A polysilicon film of 40 nm in thickness is formed at a substrate temperature of 540° C. by LPCVD by using SiH$_4$ (silane). Heat treatment is performed for 30 minutes at 850° C. in a PH$_3$ (phosphine) atmosphere so that P is diffused in the polysilicon film. An unnecessary oxide film on the surface of the polysilicon is removed by using hydrofluoric acid so that polysilicon gates 130 are formed. The polysilicon gates 130 each have a thickness of 350 nm. Each polysilicon gate 130, which serves as a gate electrode, is formed across the oxide films of 50 and 200 nm. Resistance to pressure is improved by forming the oxide film around drains into an oxide film 131 as thick as 200 nm. Patterning of the polysilicon gates 130 is completed by forming a photoresist of a gate pattern by photolithography and thereafter, performing dry etching (FIG. 3E).

Figure 3F:
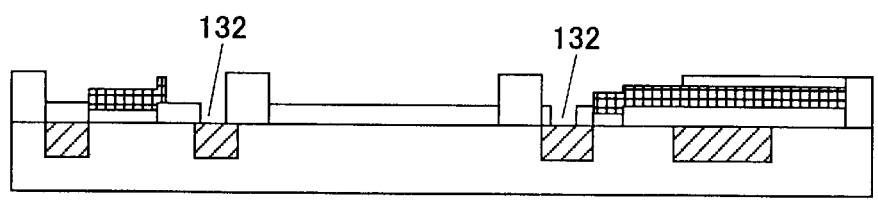

(F) Contact holes 132 are formed by performing a resist patterning by photolithography and RIE (reactive ion etching) using $CHF_3$ gas. A $3E15/cm^2$ dose of P is ion-implanted. The resist is removed by ashing (FIG. 3F).

Figure 3G:
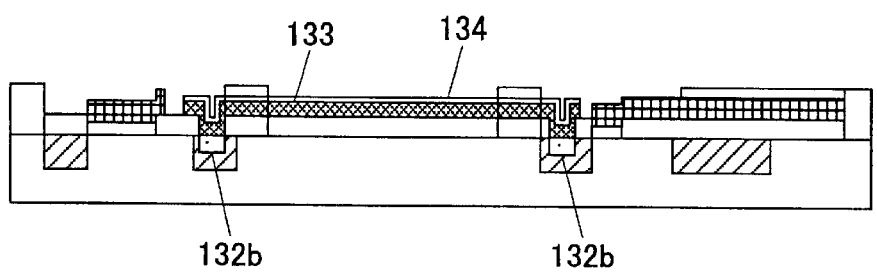

(G) A Ti (titanium) film is formed by sputtering, and a TiN film is formed by a reactive sputtering method using Ar (argon) gas including $N_2$ (dinitrogen). An oxide film is formed by plasma CVD (chemical vapor deposition) using a gas mixture of $N_2O$ (dinitrogen oxide), $SiH_4$, and He (helium). An organic resist film is formed by photolithography, and the oxide film is etched by using buffer hydrofluoric acid. The TiN film is etched by using an aqueous mixture of an ammonia aqueous solution and a hydrogen peroxide aqueous solution. Thus, an individual counter electrode 133 is formed of TiN and a passivation oxide film 134 is formed thereon. Heat is applied for a short period of time by RTA (rapid thermal anneal) so that Ti and Si react with each other to form silicide 132b in each contact part. Dicing is performed using a photoresist as protection. The resist is removed by ashing (FIG. 3G).

Figure 3H:
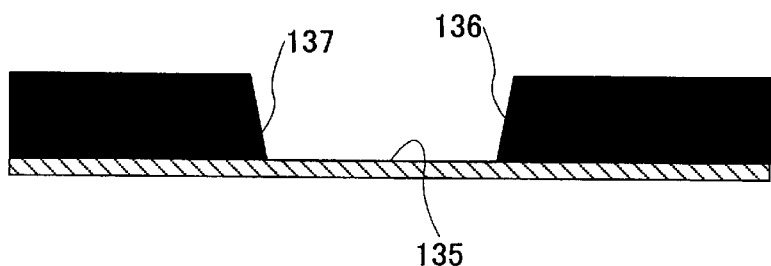

(H) Next, a description will be given of a diaphragm formation process. A thermal oxide film of 1.2 $\mu$m in thickness is formed all over a (110) double-side-polished Si substrate of 100 $\mu$m in thickness by thermal oxidation. The thermal oxide film is removed entirely from only one surface of the Si substrate, and vapor phase diffusion of B is performed using a solid diffusion source so that an approximately $1E20/cm^3$ high-concentration diffusion layer is formed 1.5 $\mu$m deep under the entire surface of the Si substrate. A resist is patterned on the other surface of the Si substrate covered with the oxide film and dry etching is performed so that a liquid pressure chamber pattern is formed. This pattern is aligned so that the (111) plane of the substrate is parallel to the length (longitudinal-side direction) of a liquid pressure chamber. The B-diffused surface is protected by a jig. Anisotropic etching is performed using a KOH (potassium hydroxide) or TMAH (trimethyl ammonium hydroxide) aqueous solution. Since an etching rate is extremely slowed down in the high-concentration B layer, it is possible to form a liquid pressure chamber 136 by etching the Si substrate with a diaphragm 135 of a set thickness of 2 $\mu$m being left unetched. The Si substrate has exposed surfaces in the etched part, which surfaces serve as wall faces 137 of the liquid pressure chamber 136. The Si substrate (wafer) is divided by dicing into chips (diaphragm Si substrates) of a required size (FIG. 3H).

(I) The electrode Si substrate and the diaphragm Si substrate are aligned with each other to be directly joined at 1000° C. in an oxygen atmosphere. Sputtering is performed using a metal mask to deposit an Al—Si alloy of 300 nm in thickness on each pad, and sintering is performed in an Ar and $H_2$ (hydrogen) gas atmosphere (FIG. 4A). As a result, individual electrode pads 138, a pad electrode 139a for a driving power source, a pad electrode 139b for the gate electrode of each MOS transistor for discharging, and a pad electrode 139c for the source electrode of each MOS transistor for discharging are formed. Thus, an actuator part defined by the electrode Si substrate and the liquid pressure chambers 136 is completed (FIG. 4B).

Figure 5:
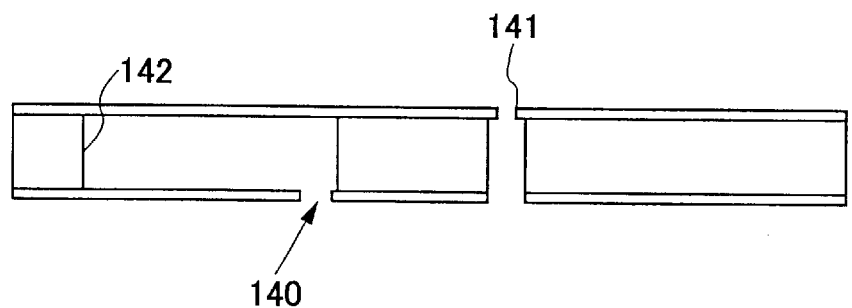
FIG. 5 is another diagram for illustrating the ink jet head production method.

(J) A hole is formed in a stainless steel plate by etching to serve as a channel 140. A hole is formed in another stainless steel plate by using a carbon dioxide laser to form a nozzle 141. These stainless steel plates are bonded in layers so that a common liquid chamber 142 and a path for the nozzle 141 are formed therebetween (FIG. 5).

The bonded stainless steel plates including the nozzle 141, the common liquid chamber 142, and the channel 140 are bonded to the diaphragm Si substrate having the liquid pressure chamber 136 formed therein so that the ink jet head of the structure as shown in FIG. 2 is finally formed.

Figure 1:
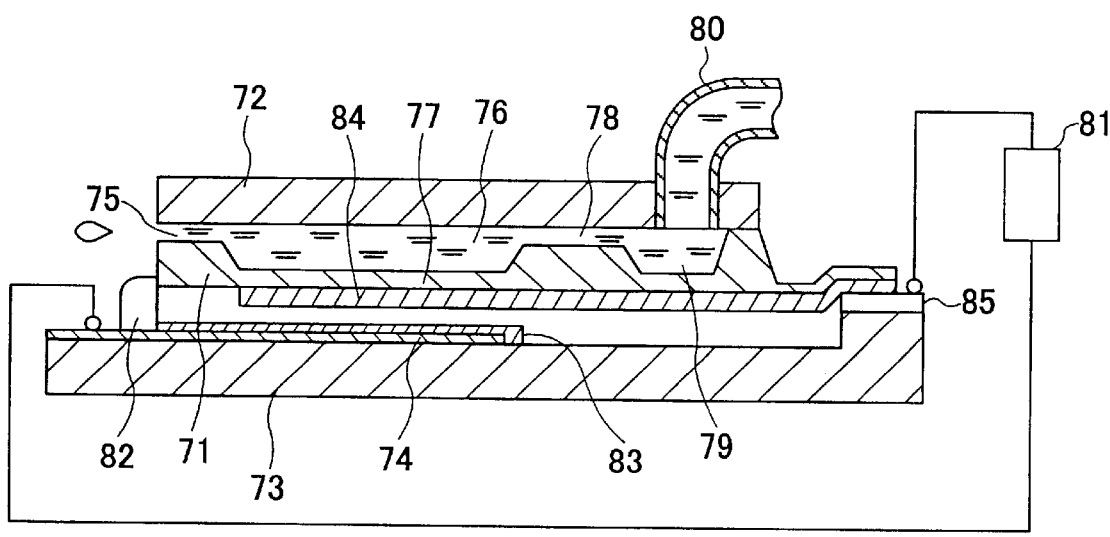
FIG. 1 is a sectional view of a conventional ink jet head.

A driving voltage is 100 V for the conventional ink jet head that does not have an active element formed in the substrate as shown in FIG. 1. On the other hand, the ink jet head of this embodiment is driven by applying a voltage of only 20 V to the MOS transistor gate of each bit although the ink jet head is supplied with a direct current of 100 V. Since the MOS transistor is connected to the individual counter electrode 133 in each bit, the output of an integrated circuit for generating a driving signal is lowered, thus reducing the cost of the driving voltage.

Second Embodiment

Figure 6:
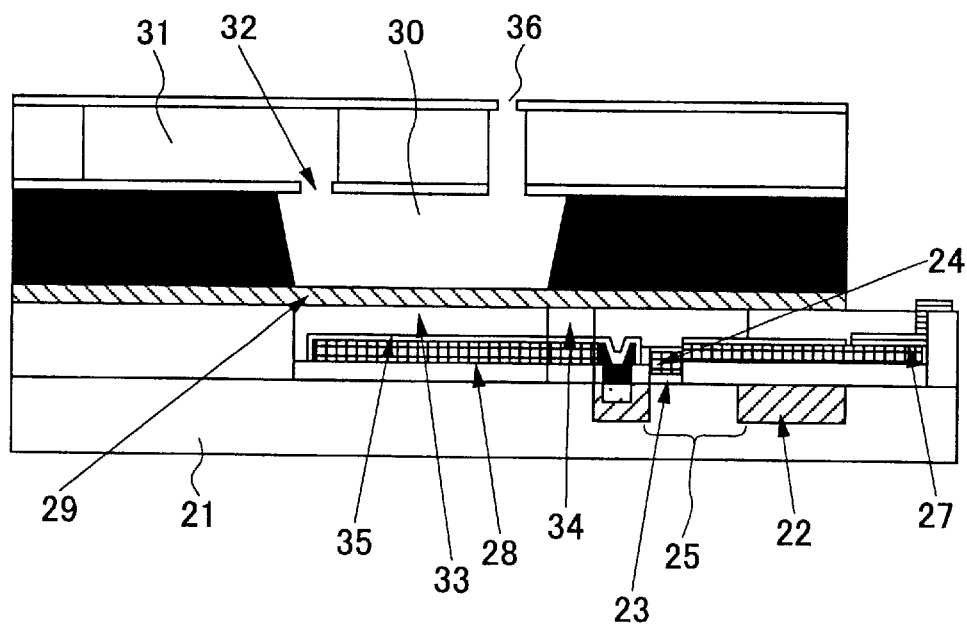
FIG. 6 is a sectional view of an ink jet head according to a second embodiment of the present invention.

FIG. 6 is a sectional view of an ink jet head according to a second embodiment of the present invention. Specifically, FIG. 6 is a sectional view of a bit of the ink jet head. The ink jet head has the same dimension as that of the first embodiment but a different driving part structure as described below.

According to FIG. 6, the ink jet head of the second embodiment includes, in each bit thereof, a Si substrate 21, an n-type diffusion layer 22, a gate oxide film 23, polysilicon gate electrodes 24, an electrode 27, an individual counter electrode 28, a diaphragm 29, a liquid pressure chamber 30, a common liquid chamber 31, a fluid resistance 32, a gap 33, partition walls 34, a passivation oxide film 35, and a nozzle 36. A MOS transistor 25 for switching is defined by the n-type diffusion layer 22, the gate oxide film 23, and the polysilicon gate electrode 24. In a desired bit, a driving signal is transmitted to the electrode 27 to increase the gate voltage of the MOS transistor 25 so that the MOS transistor 25 is turned on. The individual counter electrode 28 is supplied and charged with voltage from a DC source, thereby deforming the diaphragm 29. As a result, the volume of the liquid pressure chamber 30 is increased so that the ink is supplied from the common liquid chamber 31 through the fluid resistance 32 to the liquid pressure room 30. Then, the gate voltage of he MQS transistor 25 is lowered to turn off the MOS transistor 25.

In the first embodiment, the DC voltage is applied as a supply voltage, while in the second embodiment, a supply voltage with a driving waveform is applied to the drain of the MOS transistor 25 (gate element). The driving voltage is applied only to the individual counter electrode 28 of the desired bit and thereafter is discharged by turning on the MOS transistor 25 connected to the individual counter electrode 28. In the other bits of the ink jet head, the MOS transistors 25 are turned off so that currents are prevented from flowing to the individual counter electrodes 28, thereby preventing the diaphragms 29 from being displaced. Thus, it is possible to drive only the desired bit by selectively turning on or off each bit by means of at least one high-voltage driving power source.

The n-channel MOS transistors employed in this embodiment may be replaced with p-channel MOS transistors. Further, each individual counter electrode 28, which, in this embodiment, is formed of TiN that is a compound of a refractory metal, may be formed of W and tungsten silicide.

Figure 7A:
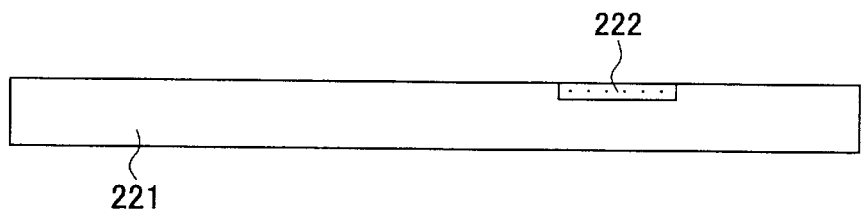
FIGS. 7A through 7G are diagrams for illustrating an ink jet head production method according to the second embodiment of the present invention.
Figure 7B:
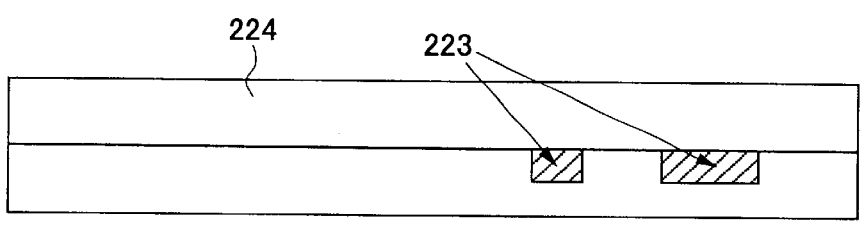
Figure 7C:
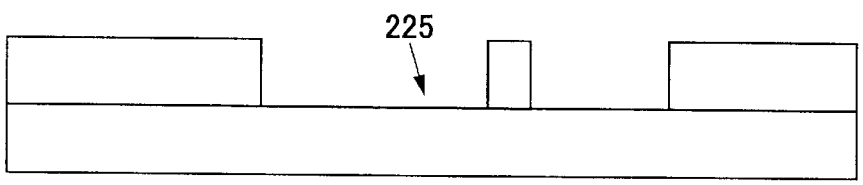
Figure 7D:
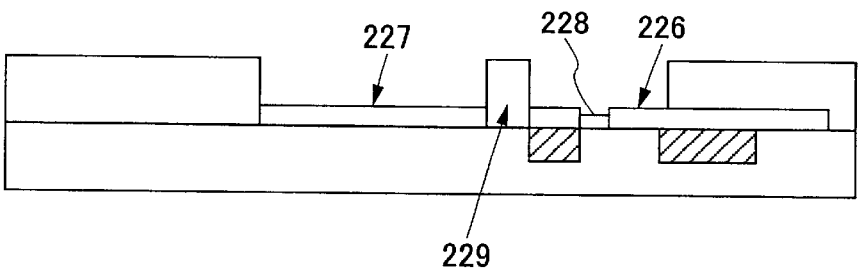
Figure 7E:
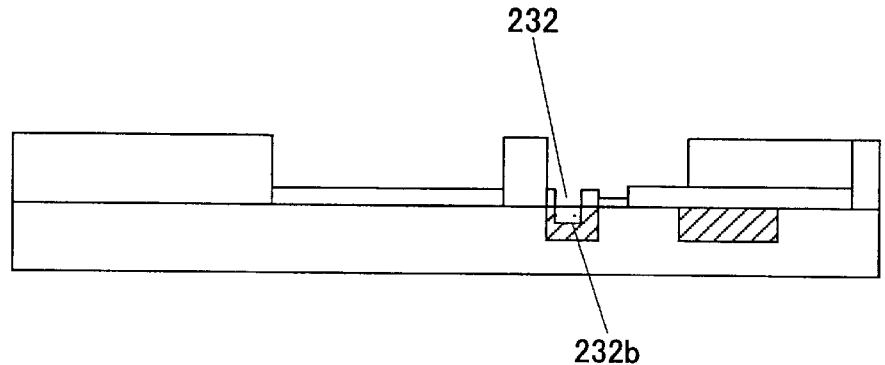
Figure 7F:
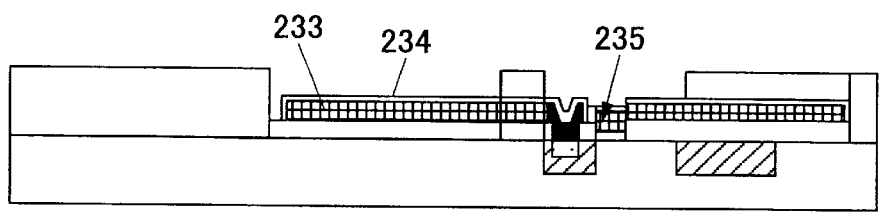
Figure 7G:
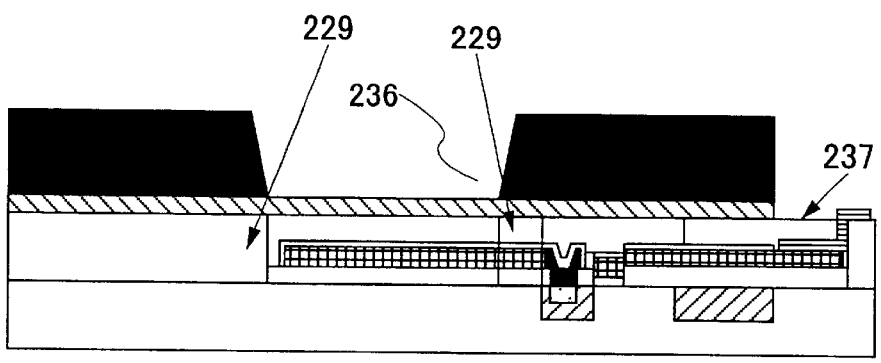
Figure 8:
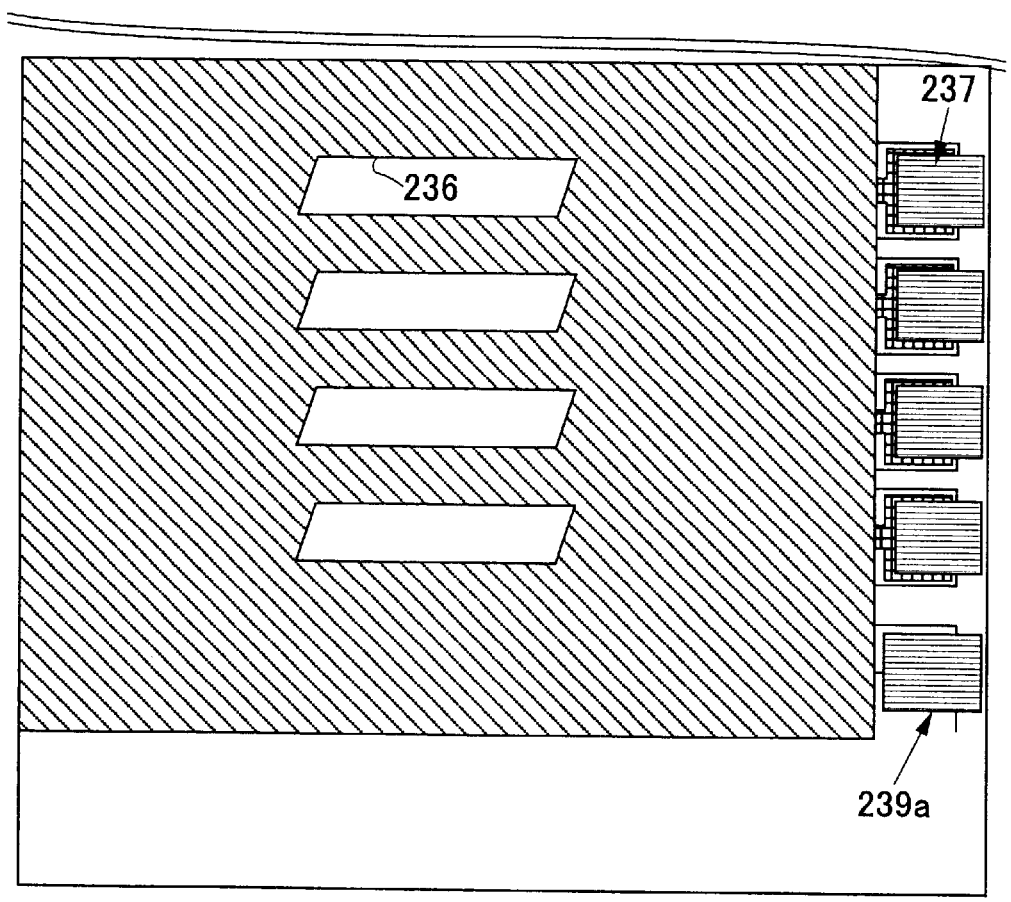
FIG. 8 is another diagram for illustrating the ink jet head production method.

Next, a description will be given, with reference to FIGS. 7A through 8, of a substrate production method of an ink jet head according to the second embodiment. This method employs a common MOS device production process. FIGS. 7A through 7G only show one bit of the ink jet head for simplicity purposes, and a description is made accordingly. An n-channel MOS device employed in the ink jet head in the following description may be replaced with a p-channel MOS device.

(A) A (100) single-crystal p-type Si substrate 221 of a sheet resistance of 10 Ωcm is preferably used. A resist is patterned on the Si substrate 221 by photolithography, and a 2E12/cm$^2$ dose of B (boron) is ion-implanted into the Si substrate 221 at an energy of 30 KeV. A P-type impurity layer 222 consequently formed where a MOS transistor is formed is called a channel stopper that is an acceptor impurity preformed to prevent the spread of an n-type inversion layer to the sides of a gate and consequent current leakage (FIG. 7A).

(B) A resist pattern is formed by photolithography. A 3E15/cm$^2$ dose of P (phosphorus) is ion-implanted at an energy of 50 KeV, and an n$^+$ diffusion layer 223 is formed by performing heat treatment for 40 minutes at 1150° C. in a nitrogen atmosphere. A thermal oxide film 224 of 2000 nm in thickness is formed through thermal oxidation at 1100° C. (FIG. 7B).

(C) A pattern for a gap 225 between a diaphragm and an individual counter electrode is formed by photolithography using a photoresist. Dry etching is performed on the oxide film 224 using CHF$_3$ gas so that the surface of the Si substrate 221 is exposed (FIG. 7C).

(D) In order to perform selective oxidation by LOCOS, a buffer oxide film of 20 nm in thickness is formed and a silicon nitride film is formed by LPCVD. A resist pattern is formed by photolithography and openings are formed in the silicon nitride film by dry etching. Thermal oxidation is performed so that a field oxide film 226 of 210 nm in thickness and an oxide film 227 of 210 nm in thickness serving as a base for the individual counter electrode. The oxide films 226 and 227 are each etched by approximately 10 nm in thickness by a HF aqueous solution, and etching is performed on the overall surface of the nitride film using thermal phosphoric acid. A gate oxide film 228 of 50 nm in thickness is formed by dry oxidation. The thickest parts of the thermal oxide film 224 are formed into partition walls 229 (FIG. 7D).

(E) An organic resist is patterned by photolithography so that a contact hole 232 is formed by RIE using a gas mixture of CHF$_3$ and H$_2$. A 3E15/cm$^2$ dose of P is ion-implanted. The resist is removed by ashing. A Ti film is formed by sputtering, and heat treatment is performed by RTA so that Ti and Si react with each other to form silicide 232b in each contact part. Unreacted Ti is removed by using an aqueous mixture of an ammonia aqueous solution and a hydrogen peroxide aqueous solution (FIG. 7E).

(F) A polysilicon film of 450 nm in thickness is formed at a substrate temperature of 540° C. by LPCVD by using SiH$_4$. Heat treatment is performed for 30 minutes at 850° C. in a PH$_3$ atmosphere so that P is diffused in the polysilicon film. An unnecessary oxide film on the surface of the polysilicon is removed by using thin hydrofluoric acid. An organic resist is patterned by photolithography and RIE is performed using a gas mixture of C$_{12}$ and HBr (hydrogen bromide) so that a pattern of a polysilicon electrode 233 that is the individual counter electrode and a polysilicon gate 235 are formed. The polysilicon film is thermal-oxidized at 1000° C. so that an oxide film of 150 nm in thickness and a passivation oxide film 234 are formed (FIG. 7F).

(G) A liquid pressure chamber 236 is formed by processing a (110) wafer as in the first embodiment. Further, as in the first embodiment, a diaphragm Si substrate obtained from the wafer is joined directly to the Si individual electrode substrate so that the partition walls 229 are joined to the diaphragm Si substrate (FIG. 7G).

(H) The polysilicon oxide film of each pad part is removed by RIE by using a metal mask. An Al—Si alloy film is formed by sputtering by using the metal mask so that pad electrodes 237 for gate element gates and a pad electrode 239a for a driving input are formed. As in the first embodiment, bonded stainless steel plates including a nozzle and a common liquid chamber are bonded to the diaphragm Si substrate including the liquid pressure chamber 236.

As a result, the ink jet head as shown in FIG. 6 is finally obtained.

Thus, according to this embodiment, completed is the ink jet head having MOS transistors formed as gate elements on the substrate on which the polysilicon electrodes 233 are formed. Although this ink jet head requires, as a driving power source, at least one circuit for generating a driving signal of 100 V, each bit requires only one MOS transistor as a gate element. Therefore, this ink jet head is simpler in structure.

The ink jet head of the second embodiment employs only one circuit for generating a driving signal of 100 V to supply a gate signal of 20 V to a desired bit so that the bit ejects 7 pl of ink.

Third Embodiment

A description will be given of a third embodiment in which a thin film transistor is employed as a driving element. Laser-crystallized polysilicon is employed as a thin film material. Boro-silicate glass is employed as an individual electrode substrate. When boro-silicate glass is employed as a substrate, unlike the case of a Si substrate, a high-temperature process of 500° C. or over cannot be applied. However, since a process temperature of a thin film transistor is relatively low, the thin film transistor is formable on the boro-silicate glass substrate.

Figure 9:
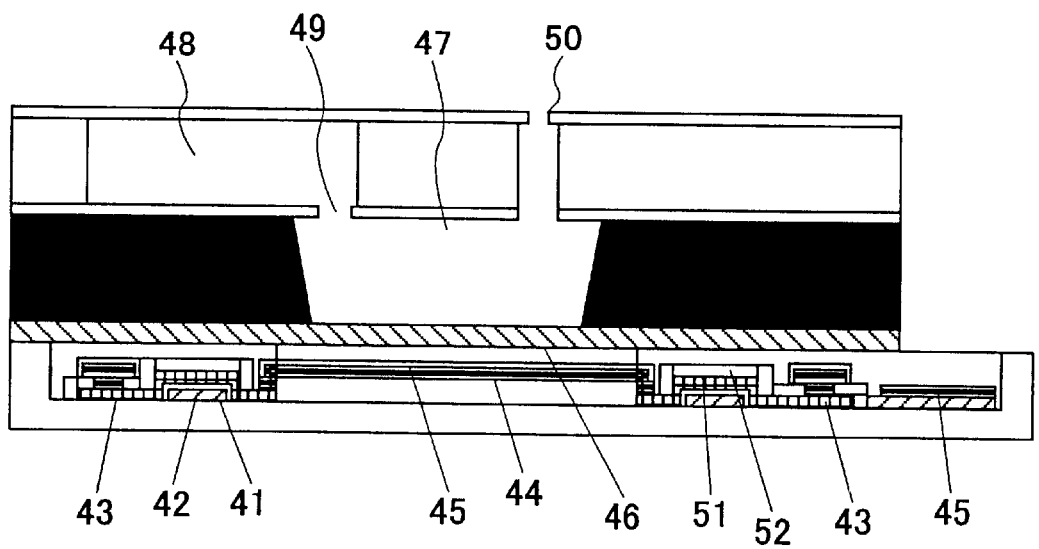
FIG. 9 is a sectional view of an ink jet head according to a third embodiment of the present invention.

FIG. 9 is a sectional view of an ink jet head according to the third embodiment of the present invention. More specifically, FIG. 9 is a sectional view of a bit of the ink jet head. The ink jet head may include one bit or more.

According to FIG. 9, the ink jet head includes, in each bit thereof, gate electrodes 41, a gate oxide film 42, contact holes 43, an individual counter electrode 44, pad electrodes 45, a diaphragm 46, a liquid pressure chamber 47, a common liquid chamber 48, a fluid resistance 49, a nozzle 50, a polysilicon film 51 of thin film transistors, and a passivation oxide film 52.

A description will be given, with reference to FIGS. 10A through 10F, of a production method of an ink jet head according to the third embodiment. The ink jet head has the same dimensions as that of the first embodiment. FIGS. 10A through 10F only show one bit of the ink jet head for simplicity purposes.

Figure 10A:
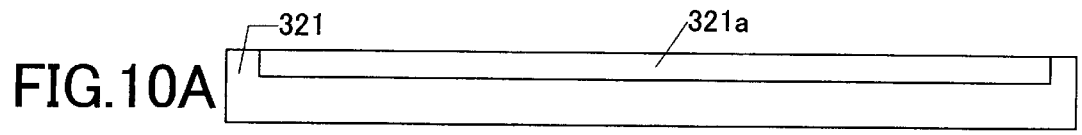
FIGS. 10A through 10F are diagrams for illustrating an ink jet head production method according to the third embodiment of the present invention.

(A) Boro-silicate glass close to single-crystal silicon in a linear expansion coefficient is employed as an electrode substrate 321. A Ni film of 300 nm in thickness is formed thereon by sputtering. An organic resist pattern is formed by photolithography. Etching is performed using an etchant of nitric acid, acetic acid, and acetone in the ratio of 1:1:1 and then the boro-silicate glass electrode substrate 321 is etched by using hydrofluoric acid so that a gap part 321a is formed. The Ni film is removed by the same etchant (FIG. 10A)

Figure 10B:
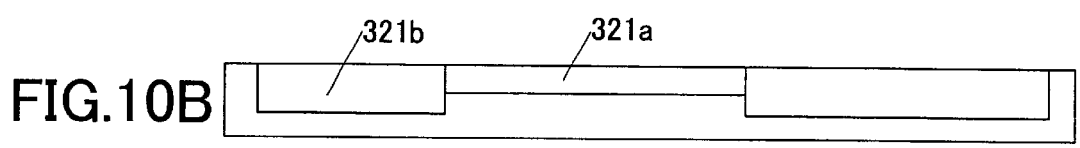

(B) Similarly, a Ni film is formed, a pattern is formed by photolithography, the Ni film is etched, and the boro-silicate glass electrode substrate 321 is etched. The Ni film serving as a mask is removed and grooves 321b for driver devices are formed (FIG. 10B)

Figure 10C:
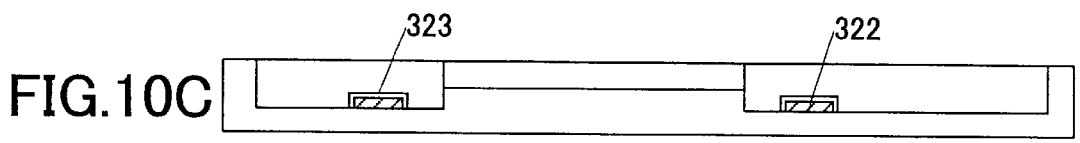

(C) Gate electrodes 322 are formed. A Cr (chromium) film is formed by sputtering. An organic resist is patterned by photolithography, and the Cr film is etched by an etchant. For instance, a solution mixture of red prussiate, sodium hydroxide, cerium (IV) nitrate, and hydrogen peroxide is employed as the etchant. A gate oxide film 323 is formed. An oxide film of 100 nm in thickness is formed by plasma CVD using a gas mixture of $N_2O$, $SiH_4$, and He. An organic resist is patterned by photolithography, and etching is performed by using buffer hydrofluoric acid. The resist is removed by ashing (FIG. 10C).

Figure 10D:
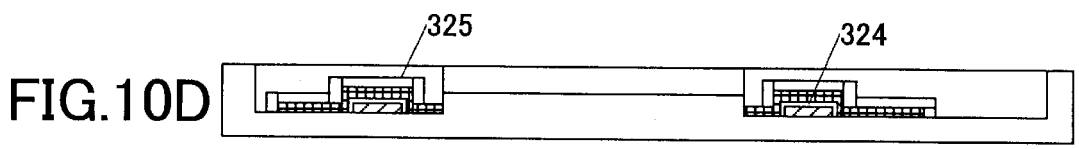

(D) An amorphous Si film is formed by plasma CVD using a gas mixture of $Si_2H_2$ (disilicon dihydride) and $H_2$. An organic resist pattern is formed by photolithography, and a $3E15/cm^2$ dose of P is ion-implanted. The resist is removed by ashing. The amorphous Si is crystallized into polysilicon by using an excimer laser as in a common recrystallization technique. An organic resist pattern is formed by photolithography and RIE is performed by using HBr gas so that patterning is performed on the polysilicon. A gate oxide film 325 of 200 nm in thickness is formed by plasma CVD using a gas mixture of $N_2O$, $SiH_4$, and He. A polysilicon film 324 of thin film transistors is formed under the gate oxide film 325 (FIG. 10D).

Figure 10E:
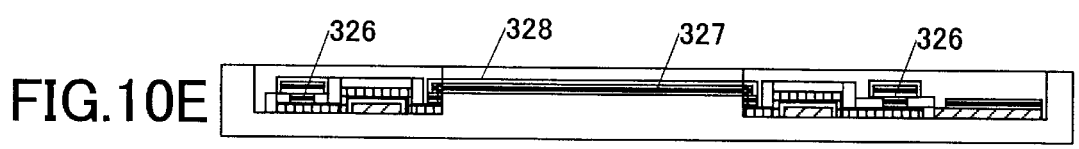
Figure 10F:
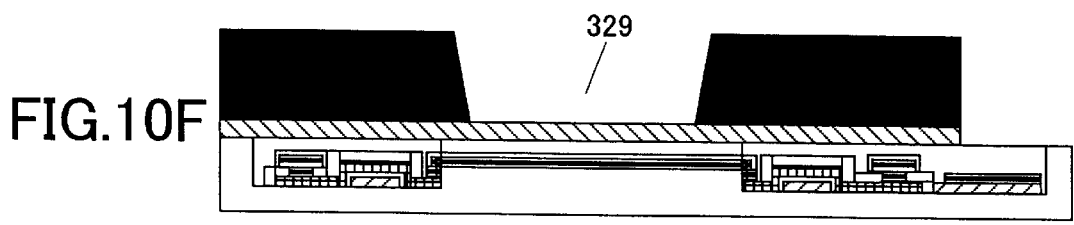

(E) A resist is patterned by photolithography and etching is performed using a gas mixture of $CHF_3$ and $H_2$ so that contact holes 326 are formed. An Al film is formed by sputtering. An organic resist is patterned by photolithography, etching is performed using a solution mixture of acetic acid, phosphoric acid, and nitric acid, and the resist is removed by ashing so that an individual counter electrode 327 is formed. Similarly, an oxide film of 150 nm in thickness is formed by plasma CVD. A resist is patterned by photolithography and an unnecessary oxide film is removed by using buffer hydrofluoric acid so that a passivation oxide film 328 is formed (FIG. 10E).

(F) As in the first embodiment, a (110) wafer is processed so that a liquid pressure chamber 329 is formed therein. Alignment is performed, and anodic bonding is performed on a single-crystal Si liquid chamber (diaphragm) substrate and the boro-silicate glass electrode substrate 321 in Ar gas. For instance, a voltage of 500 V is applied for 30 minutes at a temperature of 400° C. with the glass electrode substrate 321 being positive and the Si substrate being negative. As in the first embodiment, stainless steel plates including a nozzle and a common liquid chamber are attached to the liquid chamber substrate including the liquid pressure chamber. In order to lower resistance, each thin film transistor has a width of its gate which width is perpendicular to the source and drain thereof set to 1 nm. As a result, the ink jet head as shown in FIG. 9 is finally obtained.

According to this structure, as in the first embodiment, the ink jet head of this embodiment can be driven by a single DC power source of 100 V and an output of 20V from a driving integrated circuit to each gate.

Figure 11:
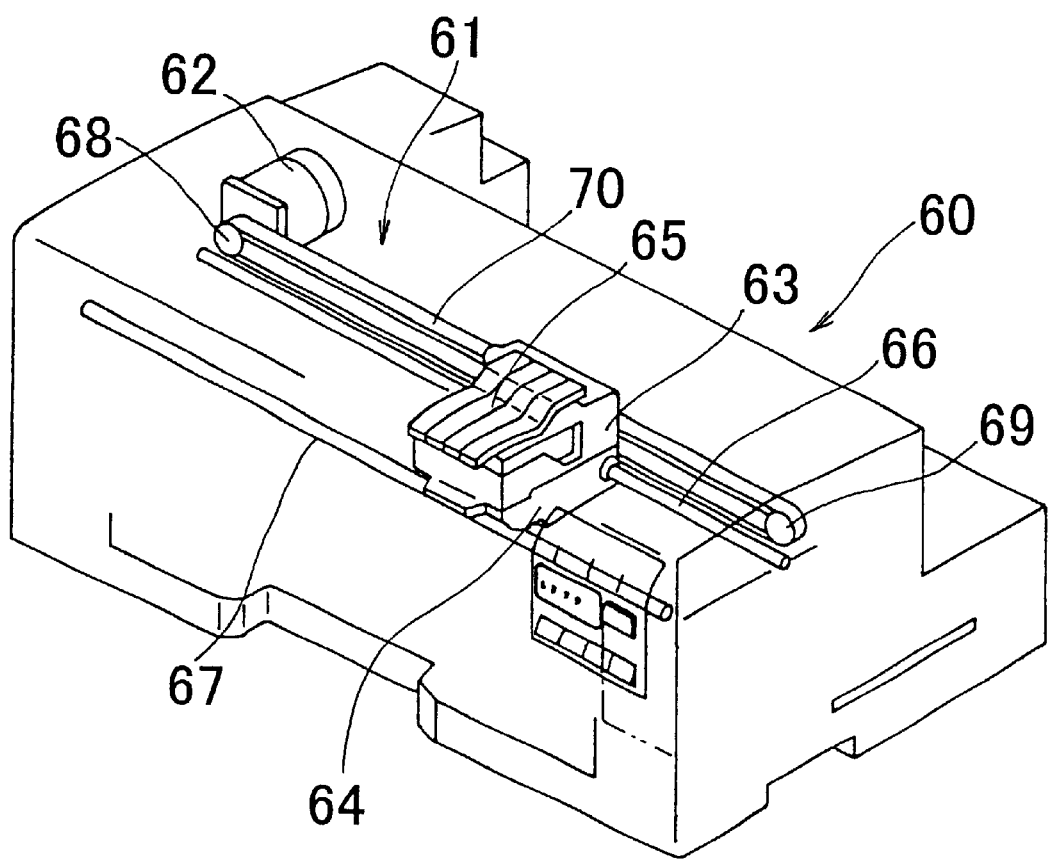
FIG. 11 is a diagram showing an ink jet imaging apparatus according to the present invention.

FIG. 11 is a diagram showing an ink jet imaging apparatus that includes one of the ink jet heads of the first through third embodiment of the present invention.

The ink jet imaging apparatus includes an apparatus body 60 provided with a print mechanism 61. The print mechanism 61 includes a carriage 63 movable in primary scanning directions, a recording head 64 including the ink jet head and mounted on the carriage 63, and an ink cartridge 65 for supplying ink to the ink jet head. A recording paper (not shown) is supplied from a paper tray or cassette (not shown) provided to a front side or bottom of the imaging apparatus. A print image is formed on the supplied recording paper by the print mechanism 61, and the recoding paper is ejected onto an eject tray (not shown) provided on a backside of the apparatus body 60.

The print mechanism 61 has a main guiding rod 66 and a sub-guiding rod 67 that rotatably support the carriage in the primary scanning directions. The ink jet head of the recording head 64 has nozzles that eject ink droplets toward the recording paper. The recording head 64 is situated under the carriage 63.

The cartridge 63 is movable in the primary scanning directions by a timing belt 70 provided between a drive pulley 68 rotated by a primary scanning motor 62 and an idle pulley 69.

The production costs of a driving circuit for driving each bit of the ink jet head of this imaging apparatus are kept low by lowering a driving voltage even when the number of bits is increased for a high-speed recording purpose. Accordingly, this imaging apparatus is also producible at low costs.

The present invention is not limited to the specifically disclosed embodiments, but variations and modifications may be made without departing from the scope of the present invention.

The present application is based on Japanese Patent Application No. 2000-237824 filed on Aug. 4, 2000, the entire contents of which are hereby incorporated by reference.

What is claimed is:

1. An ink jet head comprising:
   a liquid chamber for containing ink, the liquid chamber being formed in a first substrate;
   a diaphragm formed in the first substrate to serve as a bottom of said liquid chamber;
   an individual electrode formed on a second substrate, the individual electrode being formed of a refractory metal and a compound thereof; and
   an active element forming a driving circuit for driving said diaphragm, the active element being formed in the second substrate,
   wherein said diaphragm is deformable by electrostatic force generated between said diaphragm and said individual electrode and exerts restoring force of said diaphragm to pressurize said liquid chamber so that the ink is ejected from the ink jet head.

2. The ink jet head as claimed in claim 1, wherein said metal is titanium and said compound is titanium nitride.

3. The ink jet head as claimed in claim 1, wherein said metal is tungsten and said compound is tungsten silicide.

4. The ink jet head as claimed in claim 1, further including a film of a thin film semiconductor material formed on the second substrate.

5. The ink jet head as claimed in claim 4, wherein said active element is a MOS transistor including the thin film semiconductor material.

6. The ink jet head as claimed in claim 4, wherein said active element is a thin film transistor including the thin film semiconductor material.

7. An ink jet head comprising:
   a liquid chamber for containing ink, the liquid chamber being formed in a first substrate;

a diaphragm formed in the first substrate to serve as a bottom of said liquid chamber;

an individual electrode formed on a second substrate; and a MOS transistor formed in the second substrate as an active element forming a driving circuit for driving said diaphragm, wherein said diaphragm is deformable by electrostatic force generated between said diaphragm and said individual electrode and exerts restoring force of said diaphragm to pressurize said liquid chamber so that the ink is ejected from the ink jet head.

8. The ink jet head as claimed in claim 7, further including a film of a thin film semiconductor material formed on the second substrate.

9. The ink jet head as claimed in claim 7, wherein the individual electrode is made of polysilicon.

10. An ink jet head comprising:

a liquid chamber for containing ink, the liquid chamber being formed in a first substrate;

a diaphragm formed in the first substrate to serve as a bottom of said liquid chamber;

a film of a thin film semiconductor material formed on a second substrate;

an individual electrode formed on the second substrate and including the thin film semiconductor material; and an active element forming a driving circuit for driving said diaphragm, the active element being formed on the second substrate and including the thin film semiconductor material, wherein said diaphragm is deformable by electrostatic force generated between said diaphragm and said individual electrode and exerts restoring force of said diaphragm to pressurize said liquid chamber so that the ink is ejected from the ink jet head.

11. The ink jet head as claimed in claim 10, wherein the thin film semiconductor material is polysilicon.

12. An imaging apparatus comprising:

an ink jet head, the ink jet head comprising:

a liquid chamber for containing ink, the liquid chamber being formed in a first substrate;

a diaphragm formed in the first substrate to serve as a bottom of said liquid chamber;

an individual electrode formed on a second substrate, the individual electrode being formed of a refractory metal and a compound thereof; and an active element forming a driving circuit for driving said diaphragm, the active element being formed in the second substrate, wherein said diaphragm is deformable by electrostatic force generated between said diaphragm and said individual electrode and exerts restoring force of said diaphragm to pressurize said liquid chamber so that the ink is ejected from the ink jet head.

13. The imaging apparatus as claimed in claim 12, further including a film of a thin film semiconductor material formed on the second substrate.

14. An imaging apparatus comprising:

an ink jet head, the ink jet head comprising:

a liquid chamber for containing ink, the liquid chamber being formed in a first substrate;

a diaphragm formed in the first substrate to serve as a bottom of said liquid chamber;

an individual electrode formed on a second substrate; and a MOS transistor formed in the second substrate as an active element forming a driving circuit for driving said diaphragm, wherein said diaphragm is deformable by electrostatic force generated between said diaphragm and said individual electrode and exerts restoring force of said diaphragm to pressurize said liquid chamber so that the ink is ejected from the ink jet head.

15. The imaging apparatus as claimed in claim 14, wherein said individual electrode is made of polysilicon.

16. An imaging apparatus comprising:

an ink jet head, the ink jet head comprising:

a liquid chamber for containing ink, the liquid chamber being formed in a first substrate;

a diaphragm formed in the first substrate to serve as a bottom of said liquid chamber;

a film of a thin film semiconductor material formed on a second substrate;

an individual electrode formed on the second substrate and including the thin film semiconductor material; and an active element forming a driving circuit for driving said diaphragm, the active element being formed on the second substrate and including the thin film semiconductor material, wherein said diaphragm is deformable by electrostatic force generated between said diaphragm and said individual electrode and exerts restoring force of said diaphragm to pressurize said liquid chamber so that the ink is ejected from the ink jet head.

17. An ink jet head production method comprising the steps of:

(a) providing first and second substrates;

(b) forming an individual electrode and an active element in the first substrate;

(c) forming a liquid chamber and a diaphragm in the second substrate; and (d) bonding the first and second substrates.

18. The method as claimed in claim 17, wherein said step (b) forms the individual electrode of a refractory metal and a compound thereof.

19. The method as claimed in claim 18, wherein said step (b) employs titanium as the refractory metal and titanium nitride as the compound.

20. The method as claimed in claim 18, wherein said step (b) employs tungsten as the refractory metal and tungsten silicide as the compound.

21. The method as claimed in claim 17, wherein said step (b) forms a film of a thin film semiconductor material so that the individual electrode and the active element include the thin film semiconductor material.

22. The method as claimed in claim 21, wherein the thin film semiconductor material is polysilicon.

23. The method as claimed in claim 17, wherein said step (b) forms a film of a thin film semiconductor material so that the active element includes the thin film semiconductor material.

24. The method as claimed in claim 23, wherein the thin film semiconductor material is polysilicon.

25. The method as claimed in claim 17, wherein said step (c) forms the liquid chamber by etching so that the diaphragm is exposed to serve as a bottom of the liquid chamber.

26. The method as claimed in claim 17, further comprising the steps of:

(e) forming a common liquid chamber and a nozzle between stainless steel plates; and (f) bonding the plates to the second substrate so that ink supplied from the common liquid chamber is ejected through the liquid chamber from the nozzle.

* * * * *